Figure 1:
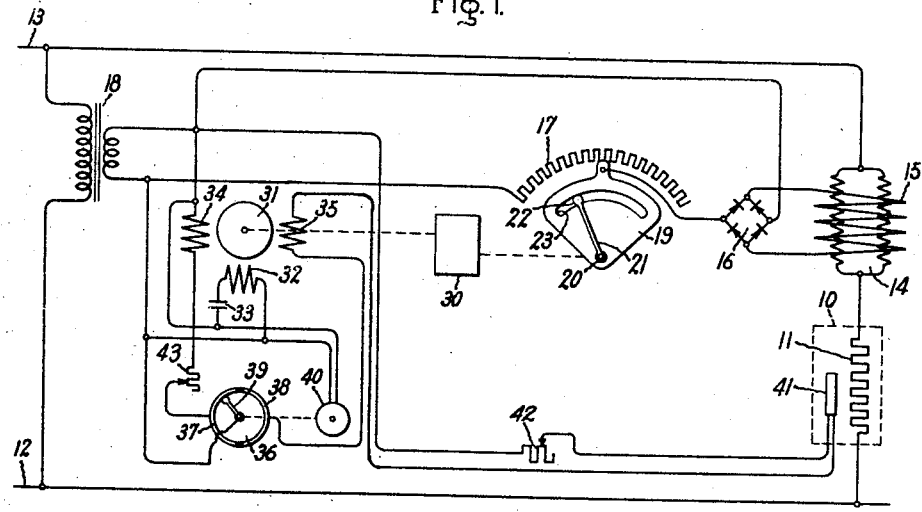

May 4, 1943.  A. W. BEDFORD, JR  2,318,358
CONDITION CONTROL SYSTEM
Filed Feb. 16, 1942

Inventor:
Alexander W. Bedford Jr.,
by Harry E. Dunham
His Attorney.

UNITED STATES PATENT OFFICE 2,318,358

CONDITION CONTROL SYSTEM

Alexander W. Bedford, Jr., Schenectady, N. Y., assignor to General Electric Company, a corporation of New York Application February 16, 1942, Serial No. 431,084

8 Claims. (Cl. 236—74)

My invention relates generally to condition control systems and has particular application to the control of temperature in enclosures, such as buildings, industrial heating furnaces and the like. As will be understood from the following description and claims, however, my invention is not necessarily limited in its broader aspects to the control of temperature but is adapted to the control of other conditions of media, such as pressure, humidity and the like.

Certain fundamental types of modulating automatic control systems are well known to those skilled in the art. The simplest control of this type is known as "floating control." In this type of system the output of a heater or other condition changing means or the input to a conditioned space is selectably increased or decreased at a predetermined relatively slow and constant rate between predetermined limits in response to the position of a two position controlling member. For example, a valve controlling the flow of steam through a conduit may be moved slowly from "full open" to "full closed" position by a constant speed reversible motor the direction of operation of which is controlled by a room thermostat. The principal objection to floating control is its slow response, though its tendency to hunt is also marked.

Another well known type of modulating control is "proportional control." In this type of control the output of a heater or other condition changing means or the input to the conditioned space is varied in direct proportion to the position of a conditioned responsive member. For example, a valve controlling the flow of steam through a conduit may be directly connected to a thermostat whereby the valve takes up a definite position of the thermostat. Such control is inherently inaccurate because of the fact that to maintain any changed output necessitates a change in the position of the control member and hence a change in the value of the condition, such as temperature, which is maintained under the new load condition. This inherent proportional characteristic is known as "load error."

My invention relates to an improved control system of a type which may be called "proportional and floating control." With such control there is no fixed relation between the position of the condition responsive member and the output of the condition changing means. My system therefore possesses no inherent load error but maintains the condition at a predetermined value regardless of the load on the system. Furthermore, according to my invention the output of the condition changing means, while varied in a continuous manner as in the floating control system, is changed at a rate proportional to the magnitude of the deviation of the controlled condition from a predetermined normal value. Thus the objectionably slow response which characterizes the simple floating control is also avoided.

Accordingly, it is an object of my invention to provide new and improved means for maintaining the condition of a medium substantially constant in any selected value.

It is a further object of my invention to provide new and improved means for controlling the temperature of an enclosure within very close limits.

Still another object of my invention is to provide a new and improved type of continuously oscillating control system for varying the output of a heater or other condition changing means directly in accordance with the load demand upon the system and at a rate proportional to variations of the controlled condition from a normal value.

It is a specific object of my invention to provide a floating and proportional temperature control system which comprises a minimum number of simple elements and which is therefore dependable and accurate in operation and inexpensive to manufacture.

According to my invention I provide a reversible motor arranged to move a control member in one direction to increase the output of a condition changing means and in the other direction to decrease the output of the condition changing means. The reversible motor is periodically reversed by a reversing switch under the control of an interval timer so that the motor alternately runs in opposite directions for constant and preferably equal periods of time. The motor is so arranged that its speed in one direction is maintained substantially constant while its speed in the other direction is controlled in accordance with the value of the controlled condition, the controlled speed being the same as the constant speed in the opposite direction when the condition is at its desired value. By this means the control member is continuously oscillated about a fixed mean position by the reversible motor when the condition is at its normal value. Upon any deviation of the condition from its normal value the speed of the motor in one direction is changed so that the mean position of the control member will progress in a direction determined by the direction of the deviation and at a rate proportional to the deviation. The control member will take up a new fixed mean position such that the changed output of the condition changing means is just sufficient to maintain the condition at its predetermined value and the motor speeds in opposite directions equal. If desired, a lost motion mechanism may be introduced between the control member and the reversible motor so that the normal continuous oscillations of the motor will have no effect upon the control member.

Figure 2:
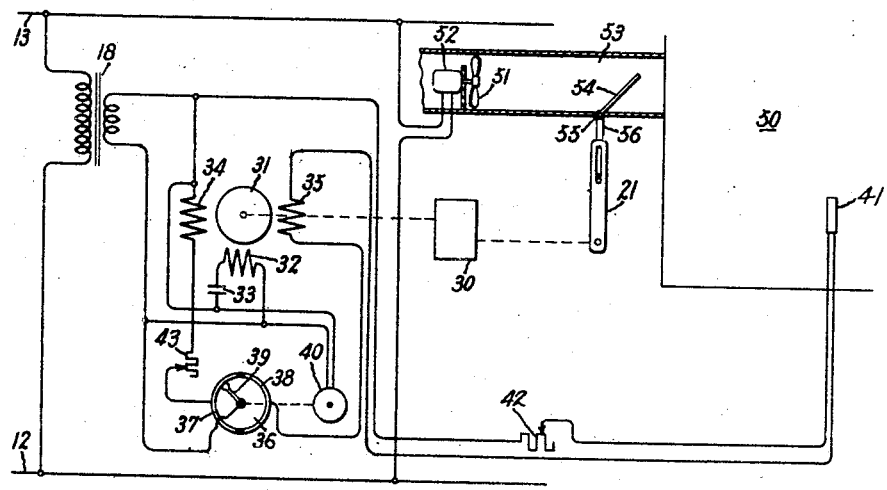

For a more complete understanding of my invention and for a further appreciation of its many objects and advantages references should now be had to the following detailed specification taken in conjunction with the accompanying drawing in which Fig. 1 is a schematic diagram of circuit connections showing my invention applied to the saturable reactor control of an electric furnace; and Fig. 2 is a schematic diagram of circuit connections showing my invention applied to a domestic temperature controlling system.

Referring now to Fig. 1, I have shown my control system connected to maintain constant the temperature of a reactor controlled electric heating furnace 10. The furnace 10 contains a resistance heating element 11 which is electrically connected to a pair of alternating current supply conductors 12 and 13 through a saturable core reactor 14. The impedance of the reactor 14 is controlled in a continuous manner by a direct current saturating winding 15 energized through a rectifier bridge 16 and a variable resistor 17. Since the control circuits are preferably of low voltage the alternating current terminals of the rectifier bridge 16 are shown connected to the secondary terminals of a control transformer 18, the primary terminals of which are connected to the alternating current supply conductors 12 and 13.

The effective resistance of the variable resistor 17 is controlled by a sliding contact 19 which is rotatably mounted upon a pivot 20. In order to move the contact member 19 progressively in one or the other direction at a rate depending upon the amount of the deviation of the temperature of the furnace 10 from normal and to an extent proportional to the heating load upon the furnace, I provide a continuously oscillating control member 21 also pivotally mounted upon or coaxially with the pivot 20 and rotatable within predetermined limits with respect to the contact member 19. Relative rotation between the contact member 19 and the oscillating control member 21 is limited by a pin and slot connection 22, 23. I wish to have it understood that if desired the oscillating control member 21 may be arranged to make direct sliding contact with the variable resistor 17, as will become more evident hereinafter with a consideration of Fig. 2 of the drawing.

The oscillating member 21 is driven through a gear train 30 by a variable speed reversible motor 31. The motor 31 may be of any desired type but as shown it is of the split phase induction type having a starting winding 32 connected in series with a condenser 33 to the secondary terminals of the control transformer 18 and a pair of forward and reverse running windings 34 and 35, respectively. The running windings 34 and 35 are alternately connected to the secondary terminals of the control transformer 18 through a periodically operated reversing switch 36.

The reversing selector switch 36 may be of any suitable type arranged alternately to connect the windings 34 and 35 of the motor 31 to the control transformer 18 for constant and preferably equal time intervals. As shown at Fig. 1, the switch is arranged to connect the motor 31 for rotation in opposite directions for equal and constant intervals of time. For this purpose the switch comprises a pair of arcuate contact members 37, 38 of equal length arranged for cooperation with a rotatable sliding contact member 39. The sliding contact 39 is rotated at constant velocity by a constant speed timing motor 40. The timing motor 40 may conveniently be a small synchronous motor of the type commonly used in electric clocks and is shown connected for energization to the secondary terminals of the control transformer 18.

To control the speed of the motor 31 in one direction in accordance with the direction and magnitude of deviations of the temperature of the furnace 10 from a predetermined value, the winding 35 has connected in series therewith a temperature sensitive resistance varying element 41. The temperature sensitive element 41 comprises a resistor having a marked negative coefficient of resistance and is preferably of the type described and claimed in Patent 2,271,975, issued Feb. 3, 1942, to Chester I. Hall. As described in the copending application the element 41 comprises an outer electrode in the form of a tube, an inner electrode centrally located in the tube and a sintered mass of granular resistance material within the tubular electrode embedding the lower end of the inner electrode. One such sintered granular resistance material may comprise magnesium oxide, sodium silicate and copper oxide.

In order selectably to adjust the normal temperature of the furnace 10, a manually adjustable biasing resistor 42 is connected in series with the resistor 41 in the circuit of the running winding 35 of the motor 31. To control the constant or reference speed of the motor 31 under the control of the winding 34, a variable biasing resistor 43 may be connected in series with the winding 34. The resistor 43 will effect a change in the amplitude of oscillation of the member 21 and is therefore useful primarily to adjust the amplitude to its proper normal value. If desired, however, the resistor 43 may be used to adjust the furnace temperature to be maintained.

With the foregoing understanding of the elements of the control system of Fig. 1 and their interconnection, the operation of the system itself will be clear from the following description:

Assuming that the electric furnace 10 is at a desired normal temperature, the resistance of the temperature sensitive element 41 will remain constant at a predetermined value and will determine a normal speed of the motor 31 in one direction under the influence of the field winding 35. In order that the speeds of the motor 31 in opposite directions shall be equal when the furnace temperature is at the desired value the biasing resistor 42 may be adjusted to set the normal speed under control of the field winding 35 equal to the constant or reference speed under control of the winding 34. Due to the fact that the timing motor 40 is rotating, the reversing switch contact 39 at constant speed, the reversible motor field windings 34 and 35 are alternately connected to the control transformer 18 for equal and constant periods of time. Since the motor 31 now rotates at equal speeds in opposite directions and for equal periods of time, the number of revolutions in each direction will be the same, and the oscillating member 21 will move back and forth equal distances on opposite sides of a fixed mean position. The lost motion mechanism 22, 23 is so arranged that it will just take up the normal oscillations of the oscillating control member 21 without producing movement of the contact member 19, but as soon as the oscillating member moves more than its normal distance in any direction the contact member 19 will be carried with it for its increment of movement.

If now the load on the electric furnace 10 is diminished so that the temperature of the furnace begins to rise, the resistance of the negative temperature coefficient resistor 41 will decrease, thereby to increase the voltage applied to the motor field winding 35 and to increase the speed of the motor 31 in the clockwise direction, as viewed in Fig. 1. The timing motor 40 and the reversing switch 36 continue to rotate at constant velocity alternately to connect the motor field windings 34 and 35 to the source of control power 18 for equal and constant time intervals. Since the constant energization of the motor field winding 34 has not been changed, the reversible motor 31 will complete its normal fixed number of revolutions in the counterclockwise direction as viewed in Fig. 1 during the interval of connecting of the motor field winding 34. However, due to the increased energization of the field winding 35 the motor 31 will complete more than its normal number of revolutions in a clockwise direction during the interval of connection of the motor field winding 35 to the source of control power 18. Thus the oscillating member 21 will be carried in a clockwise direction beyond its normal extreme position and will carry with it the contact member 19 for the small clockwise increment in its movement. Clockwise rotation of the contact member 19 increases the resistance in the alternating current circuit connected to the rectifier bridge 16, thereby decreasing the energization of the direct current saturating winding 15 of the saturable core reactor 14 and increasing the reactance of the reactor. The increased reactance of the saturable core reactor 14 has the effect of diminishing the current flowing through the resistor 11 and thereby decreasing the heat input to the electric furnace 10. If this first readjustment of the resistance of the variable resistor 17 is sufficient to reduce the temperature of the furnace 10 to its normal value, the resistance of the temperature sensitive element 41 and the current through the motor field winding 35 will again take up their normal values and normal oscillation of the member 21 will be resumed about the new mean position. If, however, the temperature of the furnace 10 is still above normal, unbalanced cycling of the oscillating member 21 will continue with the member moving a greater distance in a clockwise direction than in a counterclockwise direction during each cycle. Continued unbalanced cycling in this manner will cause the oscillating member 21 to carry with it the contact member 19 during each increment of clockwise movement so that the mean position of the oscillating control member 21 and the contact member 19 will progress in a step-by-step fashion and in a clockwise direction thereby gradually to increase the resistance in the circuit of the rectifier bridge 16. As the energization of the direct current saturating winding 15 is thus gradually reduced the temperature of the induction furnace 10 will gradually decrease thereby slowly diminishing the unbalance of the cycling until the temperature of the furnace has again attained its normal value and the oscillating member 21 is again cycling in a normal manner about a new fixed mean position.

From the foregoing description of the operation of the system upon an increase in temperature of the furnace 10 it is believed that the converse of this operation due to an increased heating load and a consequent decrease in the temperature of the furnace will be evident.

From the foregoing description it will be apparent that the mean or average position of the oscillating control member 21 and also, if a lost motion device is used, the position of the contact member 19 has no fixed relation with respect to the temperature of the electric furnace 10. For example, the operation has been followed in sufficient detail to show that when the contact member 19 is moved in one or the other direction to restore the temperature of the induction furnace to normal the member 19 remains in its new position even though the furnace 10 returns to its normal temperature and remains at that temperature. Thus, the position of the contact member 19 or the average position of the oscillating member 21 is proportional to the heating load upon the furnace 10 but is not proportional to the temperature of the furnace. Furthermore, it will be evident that the degree of unbalance produced in the cycling of the reversible motor 31 and hence the speed of progression of the mean position of the oscillating member 21 is directly proportional to the magnitude of the deviation of the temperature of the furnace 10 from its normal value. This results from the fact that the speed change of the motor 31 produced by the resistor 41 is proportional to the magnitude of the temperature deviation.

Referring now to Fig. 2, I have shown my invention applied to a system for controlling and maintaining substantially constant the temperature of a living enclosure such as a room 50. Many of the elements of the system shown in Fig. 2 are the same as those shown in Fig. 1 and corresponding elements have been assigned like reference numerals. The system of Fig. 2 differs from that of Fig. 1 primarily in that the condition changing means illustrated is a blower 51 driven by a blower motor 52 to drive conditioned air supplied to an inlet conduit 53 from a source (not shown) to the space 50 in an amount determined by the position of a movable damper 54. According to the modification shown in Fig. 2 the blower motor 52 is a constant speed motor and the damper 54 is pivotally mounted at 55 for continuous and relatively slow movement between open and closed limiting positions to regulate the input of conditioned air to the space 50. The damper 54 is provided with an operating arm 56 which is directly connected by a pin and slot pivotal connection to the oscillating member 21 corresponding to the member 21 of Fig. 1. Attention is directed to the fact that according to the modification of Fig. 2 no lost motion is provided between the oscillating control member 21 and the damper 54 so that the damper 54 continuously oscillates about a mean position in synchronism with the oscillating member 21.

It is believed that the foregoing detailed description of the mode of operation of the control system shown in Fig. 1 renders unnecessary any extended explanation of the operation of the system of Fig. 2. If it is assumed that the space 50 is to be heated to a predetermined temperature, it will be evident that under constant room temperature conditions the resistance of the temperature sensitive element 41 remains constant and the control damper 54 oscillates continuously about a fixed mean position. Upon an increase in temperature of the room the mean position of the control damper 54 will progress in a counterclockwise direction as viewed in Fig. 2 at a rate proportional to the magnitude of the deviation of the room temperature from normal and to a new final position determined in accordance with the changed load upon the heating system. Likewise, upon a decrease in the temperature of the conditioned space 50 the mean position of the control damper 54 will progress in a clockwise direction as viewed in Fig. 1 and will take up a new mean position such that the average heat input to the conditioned space will be just sufficient to balance the new heating load imposed thereon.

As shown in Fig. 2, the hot air supplied to the conduit 53 is moved forward to the conditioned space 50 by a constant speed fan 51, and the heat input to the space 50 is controlled by the damper 54. It will be readily understood by those skilled in the art, however, that it is within the purview of my invention to use any other known means to change the heat input to the conditioned space 50 in accordance with changes in the mean position of the oscillating member 21. For example, one obvious expedient in view of the system of Fig. 2 is to eliminate entirely the damper 54 and to control the speed of the blower motor 52 in accordance with the mean position of the oscillating member 21. Such speed control may be carried out by means of a variable resistor controlled in the manner of the variable resistor 17 of Fig. 1 with or without a lost motion connection.

From the foregoing detailed description it will be evident that I have disclosed a control system of the proportional and floating type which, while it demonstrates a more rapid response than a simple floating control system and at the same time avoids the inherent load error of a simple proportional control system, is composed of a minimum number of simple and conventional control elements. The fundamental elements of my system comprise nothing more than a simple timing motor, a reversing switch and a variable speed reversible motor.

While I have shown and described only certain illustrative embodiments of my invention, many variations and modifications will undoubtedly occur to those skilled in the art. For example, as previously mentioned while the reversing switch 36 is preferably arranged alternately to connect the field windings of the reversible motor 31 to the power source for equal periods of time, it is not necessary that these periods be equal so long as they are constant. If for any reason it is desired to connect the motor field windings for unequal time intervals so that the reversible motor 31 rotates in opposite directions for unequal periods, it is merely necessary to so arrange the normal speeds of the motor in opposite directions that the product of the speed and time of rotation in opposite directions is equal under normal conditions of the controlled medium. Thus the reversible motor 31 will normally rotate equal distances in opposite directions. It will be therefore understood that I intend in the appended claims to cover all such modifications as fall within the true spirit and scope of my invention.

What I claim as new and desire to secure by Letters Patent of the United States, is:

1. A condition control system comprising condition changing means, means comprising a movable element for controlling said condition changing means to maintain a normal value of said condition, reversible motor means for alternately moving said element equal distances in opposite directions thereby normally to oscillate said element about a fixed mean position, the mean position of said movable element determining the output of said condition changing means, timing means for alternately connecting said motor means for rotation in opposite directions for fixed time intervals, and means responsive to a deviation of said condition from said normal value to control the speed of said motor means in at least one direction thereby to cause said movable element to progress in a direction determined by the direction of said deviation and to restore said condition to said normal value.

2. A condition control system comprising condition changing means, means for controlling said condition changing means in a continuous manner including an oscillating member arranged by its mean position to determine the output of said condition changing means, reversible motor means for alternately moving said oscillating member in opposite directions, an interval timer for energizing said motor for movement in opposite directions for predetermined fixed periods of time, said motor periodically moving said oscillating member equal distances in opposite directions while said condition remains at a predetermined normal value, and means responsive to deviations of said condition from said normal value for controlling the speed of said motor in at least one direction.

3. A condition control system comprising condition changing means, means for controlling said condition changing means in a continuous manner including an oscillating control member arranged by its mean position to determine the output of said condition changing means, a reversible motor for driving said control member, an interval timer arranged alternately to connect said motor for energization in opposite directions for predetermined fixed periods, and means responsive to deviations of said condition from a predetermined normal value for controlling the speed of said motor in one direction, said motor moving equal distances on opposite sides of said mean position while said condition remains at said normal value, whereby upon any deviation of said condition from said normal value said mean position will progress in a direction determined by the direction of said deviation and at a rate proportional to the magnitude of said deviation thereby to restore said condition to said normal value.

4. A condition control system comprising condition changing means, means for controlling said condition changing means in a continuous manner including an oscillating control member arranged by its mean position to determine the output of said condition changing means, a reversible electric motor for driving said control member, reversing means for said motor, timing means arranged periodically to operate said reversing means thereby alternately to connect said reversible motor for rotation in opposite directions for predetermined fixed time intervals, said motor periodically moving equal distances in opposite directions while said condition remains at a predetermined normal value, and means responsive to deviations of said condition from said predetermined normal value for controlling the speed of said motor in one direction, whereby said control member will progress in a direction determined by the deviation to restore said condition to said normal value.

5. A condition control system comprising condition changing means, means for controlling said condition changing means in a continuous manner including an oscillating control member arranged by its mean position to determine the output of said condition changing means, a reversible electric motor for driving said control member, a reversing switch for said electric motor arranged selectably to connect said motor to a source of electric current supply for rotation in opposite directions, an interval timer arranged periodically to actuate said reversing means thereby to provide for rotation of said motor in opposite directions for equal and fixed time intervals, means responsive to said condition for determining the speed of said motor in one direction, the speed of said motor in the opposite direction being constant and the speeds of said motor in opposite directions being equal when a predetermined normal value of said condition obtains, whereby upon any deviation of said condition from said normal value the mean position of said control member will progress in a direction determined by the direction of said deviation and at a rate proportional to the magnitude of said deviation thereby to change the output of said condition changing means and to restore said condition to said normal value.

6. In a system for controlling the temperature of an enclosure, heating means for supplying heat to said enclosure, control means for changing the output of said heating means in a continuous manner, a reversible electric motor for driving said control means, reversing means for selectably connecting said electric motor to a source of electric current supply for rotation in opposite directions, timing means arranged periodically to operate said reversing means thereby periodically to connect said motor for rotation in opposite directions for predetermined fixed time intervals, said motor normally oscillating said control member about a fixed mean position while said enclosure remains at a predetermined normal temperature, and temperature sensitive means responsive to the temperature of said enclosure for controlling the speed of said reversible motor in one direction thereby to unbalance the oscillations of said control member in response to any deviation of said temperature from said predetermined normal and to cause the mean position of said control member to progress in a direction determined by the direction of said deviation and at a rate proportional to the magnitude of said deviation.

7. A control system for maintaining constant the temperature of a space comprising heating means for supplying heat to said space, control means for changing the output of said heating means in a continuous manner, said control means comprising an oscillating control member arranged by its mean position to determine the output of said heating means, a reversible electric motor for driving said control member, a reversing switch for said electric motor arranged selectably to connect said motor to a source of electric current supply for rotation in opposite directions, an interval timer arranged periodically to actuate said reversing switch thereby to provide for rotation of said motor in opposite directions for equal and fixed time intervals, and temperature sensitive resistance means responsive to the temperature of said space for determining the speed of said motor in one direction, the speed of said motor in the opposite direction being constant and the speed of said motor in opposite directions being equal when a predetermined normal value of said temperature obtains, whereby upon any deviation of said temperature from said normal value the mean position of said control member will progress in a direction determined by the direction of said deviation and at a rate proportional to the magnitude of said deviation thereby to change the output of said heating means and to restore said temperature to said normal value.

8. A control system for maintaining constant the temperature of a space comprising heating means for supplying heat to said space, control means for changing the output of said heating means in a continuous manner, said control means comprising an oscillating control member arranged by its mean position to determine the output of said heating means, a reversible electric motor for driving said control member, the speed of said motor in one direction being constant, a reversing switch for said electric motor arranged selectably to connect said motor to a source of electric current supply for rotation in opposite directions, an interval timer arranged periodically to actuate said reversing switch thereby to provide for rotation of said motor in opposite directions for equal and fixed time intervals, temperature sensitive resistance means responsive to the temperature of said space for determining the speed of said motor in its other direction, manually operable means for controlling the speed of said motor in said other direction thereby to adjust said speed to a value equal to said constant speed in said one direction when a predetermined normal value of said temperature obtains, whereby upon any deviation of said temperature from said normal value the mean position of said control member will progress in a direction determined by the direction of said deviation and at a rate proportional to the magnitude of said deviation thereby to change the output of said heating means and to restore said temperature to said normal value.

ALEXANDER W. BEDFORD, Jr.